United States Patent
Spracklen et al.

(10) Patent No.: US 9,860,139 B2
(45) Date of Patent: Jan. 2, 2018

(54) PASSIVE MONITORING OF LIVE VIRTUAL DESKTOP INFRASTRUCTURE (VDI) DEPLOYMENTS

(71) Applicant: VMware, Inc., Palo Alto, CA (US)

(72) Inventors: Lawrence Spracklen, Boulder Creek, CA (US); Banit Agrawal, Sunnyvale, CA (US); Rishi Bidarkar, Sunnyvale, CA (US); Vikram Makhija, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 377 days.

(21) Appl. No.: 13/787,373

(22) Filed: Mar. 6, 2013

(65) Prior Publication Data

US 2014/0258872 A1    Sep. 11, 2014

(51) Int. Cl.
*H04L 12/24* (2006.01)

(52) U.S. Cl.
CPC ...... *H04L 41/5067* (2013.01); *H04L 41/5009* (2013.01)

(58) Field of Classification Search
CPC ... H04L 67/025; H04L 41/22; H04L 41/5067; H04L 41/5009
USPC ............. 709/203, 227, 223, 219; 718/1
See application file for complete search history.

(56) References Cited

U.S. PATENT DOCUMENTS

| | | | |
|---|---|---|---|
| 4,700,320 A * | 10/1987 | Kapur | G09G 5/14 345/519 |
| 7,516,208 B1* | 4/2009 | Kerrison et al. | 709/224 |
| 8,738,972 B1* | 5/2014 | Bakman et al. | 714/47.2 |
| 2002/0120484 A1* | 8/2002 | Bantz | G06Q 10/06316 705/7.26 |
| 2005/0060719 A1* | 3/2005 | Gray et al. | 719/318 |
| 2007/0182728 A1* | 8/2007 | Fujimori | G06F 3/1423 345/204 |
| 2009/0265288 A1* | 10/2009 | Chakravarty et al. | 706/11 |
| 2010/0094990 A1* | 4/2010 | Ben-Yehuda et al. | 709/224 |
| 2010/0205529 A1* | 8/2010 | Butin | G06F 9/4446 715/704 |
| 2010/0289806 A1* | 11/2010 | Lao | G09G 5/363 345/547 |
| 2010/0306163 A1* | 12/2010 | Beaty et al. | 706/52 |

OTHER PUBLICATIONS

Title: Sikuli X 1.0 documentation Date Nov 2012.*

* cited by examiner

*Primary Examiner* — Jeffrey A Gaffin
*Assistant Examiner* — Mandrita Brahmachari

(57) ABSTRACT

In one embodiment, a client device configured to remotely access a desktop hosted by a server system determines an event related to a user input for a desktop operation directed to the desktop. The client device receives a plurality of updates to a desktop graphical user interface (GUI) from the desktop hosted by the server system. Then, the client device correlates the event to an update in the plurality of updates to the desktop GUI based on a rule in a set of rules correlating events to updates. A metric is monitored for the update and information measured for the metric is stored.

23 Claims, 9 Drawing Sheets

PASSIVE MONITORING OF LIVE VIRTUAL DESKTOP INFRASTRUCTURE (VDI) DEPLOYMENTS

BACKGROUND

The term "virtual desktop infrastructure" (VDI) refers to a system that, among other things, uses a remoting protocol to connect a client device over a network to a remote desktop running on a server system (e.g., a host). The term "remote desktop" or "desktop" refers to an instance of an operating system or application that runs remotely to the user, e.g., on the server system in a remote datacenter. One aspect of a remote desktop is its graphical user interface (GUI), which is displayed on the client device. As the remote desktop runs on the server system, the content (and hence the appearance) of its GUI may change in response various factors including input from the client device (i.e., mouse clicks) or changes caused by an application running in the remote desktop on the server system (e.g., streaming video applications). These changes in the remote desktop's appearance are transmitted by the server system as image content to the client device using the remoting protocol.

One aspect of assessing the performance of a virtual desktop deployment is understanding the quality of the end-user experience. This quality will depend on, for example, the amount of latency a user perceives as he/she is interacting with his/her desktop. Understanding this quality is particularly important in large scale (e.g., enterprise) deployments since users in these deployments typically connect to their desktops under a variety of different network conditions, and since a particular server system may host many (e.g., tens, hundreds, or more) desktops that share server resources. Both of these factors (varying network conditions and high desktop-to-server consolidation ratio) increase the likelihood that users will experience poor performance at some point during their remote desktop sessions.

When creating the virtual desktop infrastructure (VDI) deployment, a customer may first perform sizing studies to understand the infrastructure required to support a desired number of desktops running a typical workflow for the customer. The sizing analysis provides the customer with an understanding of the number of server systems required to run the desktops, the size and type of the storage hierarchy required to support the desktops, the appropriate network environment, and wide area network (WAN) accelerators required for acceptable remote access to the desktops. The sizing studies may involve running automated workloads across multiple desktops to examine the impact of these desktops on the infrastructure. The automated workloads may be static pre-defined workloads or may be customizable to represent the workflow that may be anticipated for the customer. Also, the sizing studies may vary from a range of a simple study (e.g., looking at a number of desktops that can be supported by a single processor core and then extrapolating the results) to a more elaborate test including multiple server systems running a large number of desktops.

The above sizing analysis may analyze the performance of the VDI deployment in a testing environment. This may allow the test some leeway in monitoring the user experience. For example, random events may be injected into the workflow, such as a mouse event to open up an application is injected and then the response time for a corresponding application to open may be monitored. Additionally, the test may insert certain information, such as watermarks, into windows or videos that facilitate the measuring of the remote desktop response. Such measurement techniques are described in detail in U.S. Pat. Nos. 7,831,661, 8,166,107, and 8,347,344, which are wholly incorporated herein by reference. However, when the VDI deployment moves to a live deployment, randomly injecting events or visually altering images may not be possible. For example, users will not tolerate images they are viewing to be altered or have random events injected for test purposes. Thus, known methods for measuring the user experience in a test environment cannot be used in a live deployment.

Additionally, the live VDI deployment may have a workflow that is different from the workflow used in the sizing study. For example, in the live deployment, users may perform various events, such as checking personal e-mails or watching videos from the Internet, which differ from the expected load on the live VDI deployment in an unpredictable way. Also, the VDI workloads evolve over time in a way that cannot be predicted from a sizing study, such as new applications may be introduced to the live VDI deployment, application versions may change, or workflow habits may change, which all potentially impact how each user's remote desktop loads the live VDI deployment.

Because of the above issues, customers, when sizing the live deployment, often leave "headroom" in the deployment. For example, if the deployment is determined based on the sizing study to be able to support 100 users, the customer may configure the live deployment to support only 90 users. This builds in a headroom equivalent to the workload of 10 users that may allow the live VDI deployment to handle any differences from the workload tested in the sizing study. By running the VDI infrastructure under capacity, any resource utilization spikes or any medium-term changes in workflow may be accommodated, but this also underutilizes available resources.

SUMMARY

A system and method for measuring user experience in a live deployment is described. In one embodiment thereof, a client device configured to remotely access a desktop hosted by a server system determines an event related to a user input for a desktop operation directed to the desktop. The client device receives a plurality of updates to a desktop graphical user interface (GUI) from the desktop hosted by the server system. Then, the client device correlates the event to an update in the plurality of updates to the desktop GUI based on a rule in a set of rules correlating events to updates. A metric is monitored for the update and information measured for the metric is stored.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Figure 1:
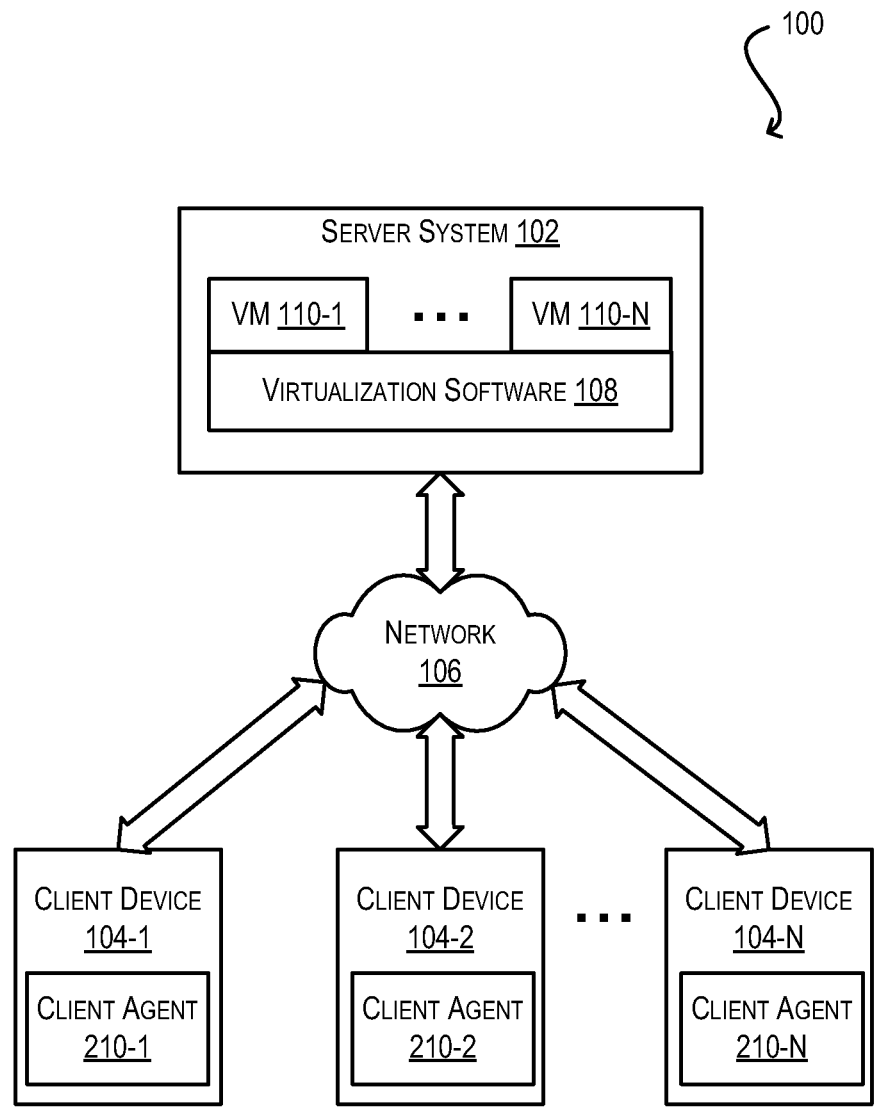
FIG. 1 depicts a virtual desktop environment according to one embodiment.

FIG. 1 depicts a virtual desktop environment 100 according to one embodiment. Virtual desktop environment 100 includes a server system 102 that is communicatively coupled with a number of client devices 104-1 through 104-N via a network 106. Network 106 may include numerous other components, such as one or more firewalls, connection brokers, management servers, etc., which are not shown here so as to not obscure salient features of environment 100. Server system 102 can interoperate with client devices 104-1 through 104-N to provide virtual desktop services to users of client devices 104-1 through 104-N. For example, server system 102 can host, for each user, a desktop that is presented by an operating system running on server system 102. As used herein, the term "desktop" refers to a computing environment in which a user can launch, interact with, and manage the user's applications, settings, and data. Each client device 104-1 through 104-N can allow a user to view on a desktop graphical user interface (GUI) (via a local display device) his/her desktop that is running remotely on server system 102, as well as provide (via one or more local input devices) commands for controlling the desktop. In this manner, the users of client devices 104-1 through 104-N can interact with the desktops hosted on server system 102 as if the desktops were executing locally on client devices 104-1 through 104-N.

In the embodiment of FIG. 1, server system 102 includes virtualization software 108 that supports the execution of one or more virtual machines (VMs) 110-1 through 110-N. In this embodiment, each virtual machine 110-1 through 110-N can execute a guest operating system (GOS) that hosts a desktop for a single user at a time. For example, if five users connect to server system 102 for the purpose of initiating remote desktop sessions, server system 102 can launch five VMs, each hosting one desktop for each of the five users. This type of remote desktop architecture where user desktops are hosted within separate, server-side virtual machines is referred to as virtual desktop infrastructure, or "VDI."

Alternatively, server system 102 can host user desktops in a non-virtualized environment. For example, server system 102 can run a single instance of an operating system (and thus, a single desktop) that is shared among multiple users in a session-based fashion. As another example, server system 102 can run a single instance of an operating system (and thus, a single desktop) that is only accessible by a single user at a time. One of ordinary skill in the art will appreciate many other ways in which the virtual desktop environment of FIG. 1 can be implemented.

Client agents 210-1-210-N monitor a live VDI deployment in real-time at client devices 104-1-104-N. The live VDI deployment may be an environment that has been deployed and is being used by users. The live VDI deployment is different from a test environment that was described above in the Background. Live VDI deployments may have more restrictions than test VDI deployments that affect how the VDI deployment can be monitored. For example, as discussed above, to monitor performance in live VDI deployments, injecting random events into a user's desktop may not be permissible, and inserting watermark or graphical overlay information into the GUI to assist in measuring the user experience may not be possible or desirable. However, when users interact with their desktops as part of the normal workflow in the live VDI deployment, the users generate a stream of events, such as mouse clicks, mouse moves, and keystrokes, at client device 104. Client agent 210 passively monitors this event stream and uses the events to measure metrics that gauge the performance of the live VDI deployment in real-time.

Because client agent 210 is passively monitoring the event stream, client agent 210 does not know which desktop update corresponds to which event. This is different from the sizing analysis as described in the Background because the sizing analysis may have performed a pre-determined action and then monitored a known response. For example, the sizing analysis injects a mouse double click to open an application and monitors the stream of graphical updates for the opening of the application. However, in the live VDI deployment, client agent 210 only receives updates to the GUI in the form of pixel updates, and therefore cannot positively associate a particular user input with a particular task, and thus which operations will be performed on the desktop. For example, the user may perform a click and drag motion, which can be intended to resize a window, copy, move, or delete a file, or select a paragraph of text. Additionally, due to this being a live VDI deployment, client agent 210 may be receiving many desktop updates for various operations being performed.

To address the above, client agent 210 correlates the events that occur to updates (e.g., visual changes to the desktop GUI) that are received from the user's desktop running on server system 102. As will be discussed in more detail below, client agent 210 may use rules to determine visual changes to the desktop GUI that correlate to an event. This allows client agent 210 to filter out display updates that do not correspond to an event. Once the correlation is made, client agent 210 may measure a metric to gauge the performance of the live VDI deployment. For example, client agent 210 measures a time from when the user input device event occurs to when a correlated update to the user's desktop is displayed. The measurement information may be logged or pushed to another monitoring solution, such as a load balancing distributed resources scheduler (DRS) or other system that can take corrective action, such as live-migrate one or more VMs off an over-loaded server to an underutilized server.

Figure 2:
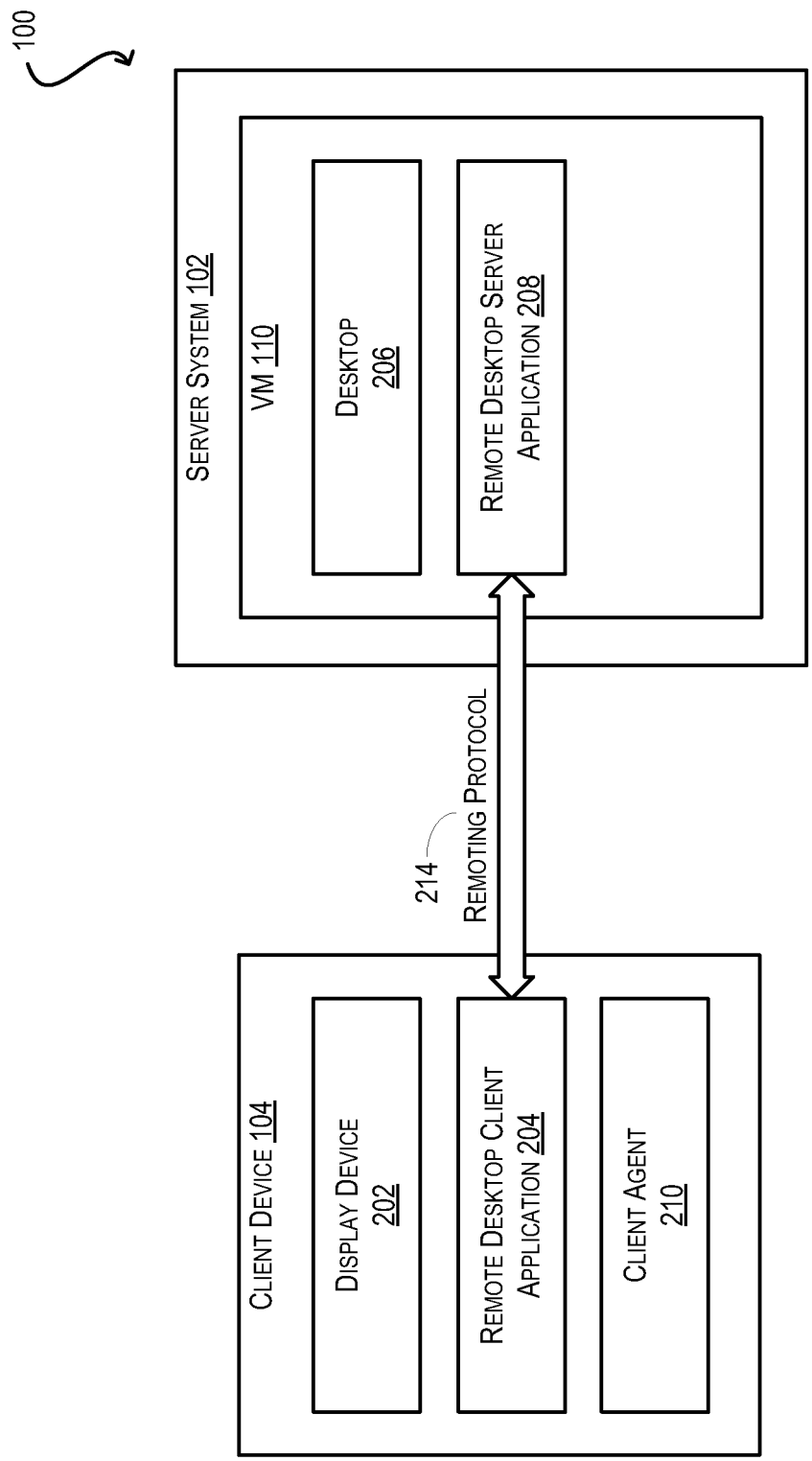
FIG. 2 provides a more detailed example of virtual desktop environment for a particular client device and a particular VM according to one embodiment.

FIG. 2 provides a more detailed example of virtual desktop environment 100 for a particular client device 104 and a particular VM 110 according to one embodiment. As shown, client device 104 includes a remote desktop client application 204 and VM 110 includes a corresponding remote desktop server application 208. Remote desktop client application 204 and remote desktop server application 208 can communicate via a remoting protocol 214 to enable the remote virtual desktop features described above with reference to FIG. 1.

For example, remote desktop server application 208 can capture images of a desktop 206 running within VM 110 and send, via remoting protocol 214, the desktop images to remote desktop client application 204. Remote desktop client application 204 can cause the received desktop images to update the desktop GUI, which is displayed on one or more display devices 202 (only one shown), thereby presenting the desktop to a user of client device 104. At the same time, remote desktop client application 204 can receive user inputs directed to desktop 206 and forward the user inputs, via remoting protocol 214, to remote desktop server application 208. As the visual state of desktop 206 changes (either in response to the user inputs or due to activity initiated by applications/processes running on desktop 206), remote desktop server application 208 can update the desktop images that are sent to remote desktop client application 204 to reflect those changes in real-time on display device 202, i.e., immediately upon the changes being generated at desktop 206.

In certain embodiments, when remote desktop server application 208 sends images of desktop 206 to remote desktop client application 204, remote desktop server application 208 may not send an image of the entire desktop; instead, remote desktop server application 208 may only send sub-regions of desktop 206 that have recently changed. For instance, if the user of client device 104 inputs a mouse movement that causes a window on desktop 206 to move a certain distance, remote desktop server application 208 can transmit only those sub-regions of desktop 206 that are affected by the mouse cursor movement. Remote desktop client application 204 can then combine the updated sub-regions with the previous desktop images received from remote desktop server application 208 to present an up-to-date representation of desktop 206 on display 202. In one example, each display device 202 at client device 104 may comprise a number of display pixels that is divided into a grid of pixel blocks, or rectangles, each being 8 pixels wide by 8 pixels tall. Each pixel block may be independently updated by receiving graphic image data for that pixel block and metadata defining its position within a designated display device 202. This approach saves network bandwidth, since the entire desktop image does not need to be transmitted over network 106 for each desktop update. Additionally, as will be described below, particular embodiments may correlate events to updates to certain sub-regions. In the above case, remote desktop client application 204 knows which sub-regions have been updated and client agent 210 can then detect these updates. However, in some cases, remote desktop client application 204 does not know which areas are updated. That is, remote desktop server application 208 sends an update for an entire frame in which case remote desktop client application 204 does not know which area of the desktop GUI was updated. When it is not possible for client agent 210 to get access to the updated sub-regions (e.g., rectangles), or situations where the granularity of the rectangles is too coarse to be recognized, client agent 210 may compute what was updated (e.g., the update rectangles. In one example, client agent 210 may perform differencing operations between frames, which would determine any updates.

To measure the performance of the live VDI deployment, client agent 210 can passively monitor events that occur based on a stream of operations performed by the user when he/she interacts with desktop 206 and the stream of desktop updates sent from server system 102 (e.g., VM 110) to client device 104. Client agent 210 may measure a metric (or metrics) based on an event and a corresponding desktop response.

As discussed above, particular embodiments correlate events to updates. In this case, client agent 210 may filter or ignore other updates that are occurring at the same time, and may only measure a metric associated with the correlated update. Client agent 210 may use various rules to perform the correlation. For example, when a user input of a right mouse click is received and a drop-down menu appears on the desktop GUI, client agent 210 may measure the delay between the occurrence of the right mouse click on client device 104 and the rendering of the drop-down menu on the desktop GUI. In this case, when client agent 210 determines that a right mouse click is received, client agent 210 may consult a rule that states that a drop-down menu should appear in a similar location to where the mouse resides. Because passive monitoring is being used, client agent 210 may not know that the update is for a drop down menu. Rather, client agent 210 determines the drop down menu is displayed based on visual changes to the desktop. In the above example, client agent 210 can monitor the location around the current position of the mouse pointer, which is known to client device 104, for a pre-defined period of time following the mouse click to determine if a rectangular screen update is observed at an expected location relative to the mouse click, within this time period. Client agent 210 may then determine that this rectangular screen update corresponds to the appearance of the drop-down menu (i.e., a rectangle update near the location of the mouse most likely corresponds to a drop-down menu). Once the rectangular screen update appears, then the time measured from the mouse click to the appearance of the rectangular screen update is stored. By providing the rule, client agent 210 can filter out other updates that are received to focus on the rectangular screen update.

The following describes other examples of possible correlations, but other situations may also be appreciated. Additionally, particular embodiments may not necessarily track and correlate every event and action. Rather, different operations, which can be detected with high accuracy and may represent common pain points for VDI operations that may be obvious and painful for the user when they degrade, but also represent some of the most commonly occurring problems during high computer processing unit (CPU) and network utilization when sending the following updates to the client devices. In a first example, when text entry is occurring, such as when a user is typing, client agent 210 can detect the position of a flashing cursor where the typing is occurring. When a keystroke occurs, client agent 210 can measure how long it takes before a new character appears. This may be an important user experience metric because users expect text to promptly appear in the window when typing.

In a second example, when mouse movement along with a left mouse button being depressed is detected, client agent 210 can monitor mouse movements on client device 104. Client agent 210 can then correlate these mouse movements with any large rectangular regions updates on the desktop that matches the mouse's trajectory to identify a window move operation. In this case, client agent 210 knows on the client side where the mouse is moved and can then monitor for updates that display the movement on the desktop that correlates to the window move operation. Additionally, client agent 210 can identify when the client's mouse stops moving and then the time that elapses until the sequences of regional updates stops, which provides another indication of the latency and the interactive performance of the system. Further, client agent 210 can measure the frequency at which updates are received during the period during which the mouse is moving, which provides additional insights into the smoothness of the update. Not only does this capture the responsiveness of window move operations, but also captures the general responsiveness of move operations within typical desktop applications, e.g., dragging a plot within a spreadsheet program, or formatting a diagram in presentation application. Further, in addition to basic object move operations, client agent 210 can also monitor object resize operations by monitoring for expanding or contracting rectangle updates touching the mouse's position when the left mouse button is depressed. In addition to capturing basic window resizing, this also captures object resizing in common desktop applications e.g. expanding a rectangle in the presentation application, or resizing object panels in a development environment. By monitoring for large region rectangular updates during a click-and-drag operation, client agent 210 is able to identify a window move or resize operation and distinguish it from other click-and-drag operations, such as file copy or text select operations.

In a third example, client agent 210 may monitor application launches. When a user performs a double mouse click, client agent 210 may monitor within a pre-determined period of time if there is a large rectangular update to the desktop image. If this large rectangular update occurs, client agent 210 may determine that the double mouse click and the large rectangular update are most likely correlated and correspond to an application launch.

In a fourth example, client agent 210 may monitor scrolling. When a user input is received that depresses an up/down arrow key or a page up/page down key, client agent 210 may attempt to correlate these events with scrolling or paging through a document. In this scenario, client agent 210 may correlate a down arrow key being depressed that is followed by a rectangular update, another down arrow key being depressed is followed by another rectangular update, and so on. In this case, a window is being scrolled through and thus desktop 206 needs to continually update the desktop GUI as information is scrolled.

In a fifth example, client agent 210 monitors application switching. When a user switches between applications, a user may use a command such as ALT-TAB or may click on the task bar. When this occurs, a large-scale update on the desktop GUI may occur to display the new application. Thus, client agent 210 may monitor for a large-scale update to the desktop and correlate this update to the ALT-TAB or taskbar click event.

In a sixth example, client agent 210 may monitor start menu interaction. The start menu icon may be displayed in a fixed area, such as the lower left-hand side or may be in other areas as configured by a user or the operating system, or client agent 210 may be able to identify the location of the start menu using pattern matching or monitoring user activity at suspect locations. Thus, client agent 210 may know when the start menu icon is selected. Client agent 210 may then correlate the appearance of a rectangular update in the area of the start menu icon to the event.

In a seventh example, client agent 210 may also measure in-application operations. For example, a single mouse click in a window that is followed by a large-scale change to the same window may correspond to various events, such as opening an e-mail in an e-mail application, clicking on a hyperlink in a browser, or other known events. While client agent 210 may not exactly know what update is occurring, such as client agent 210 does not know what webpage is being displayed, client agent 210 can track the response times for performing the update. For example, when a hyperlink is clicked, client agent 210 may monitor how long the large-scale rectangular update takes.

In an eighth example, client agent 210 may monitor video performance. If high frame rate changes are occurring over extended periods in a constant desktop location (especially when not correlated to mouse or keyboard events), client agent 210 may infer that video is being displayed. Client agent 210 may then check for frame rate oscillations, inter-frame timings, and general smoothness of the display. Although client agent 210 does not know what video is being played or even if a video is being played, client agent 210 can infer that video is being played and measure the performance of the live VDI deployment based on that inference.

In a ninth example, client agent 210 can monitor maximize and minimize operations. These can be inferred by the mouse click followed by a rapid series of expanding (or contracting in the case of minimizing) and shifted rectangle updates as Windows animation causes the application to flow out-of (or into) the task bar.

In the above events, the passive monitoring allows client agent 210 to measure metrics that can be used to gauge performance of the live VDI deployment. However, the measurements may not precisely identify the operation being executed, such as client agent 210 may not be able to state that it took X seconds to launch a specific application. However, client agent 210 may be able to generalize that on average, X seconds are taken to launch applications. By averaging over multiple events, client agent 210 may lessen the reporting of false positives or the generating of false alerts. Thus, if on average, the time to open applications increases past a threshold, client agent 210 may then generate an alert.

Figure 3:
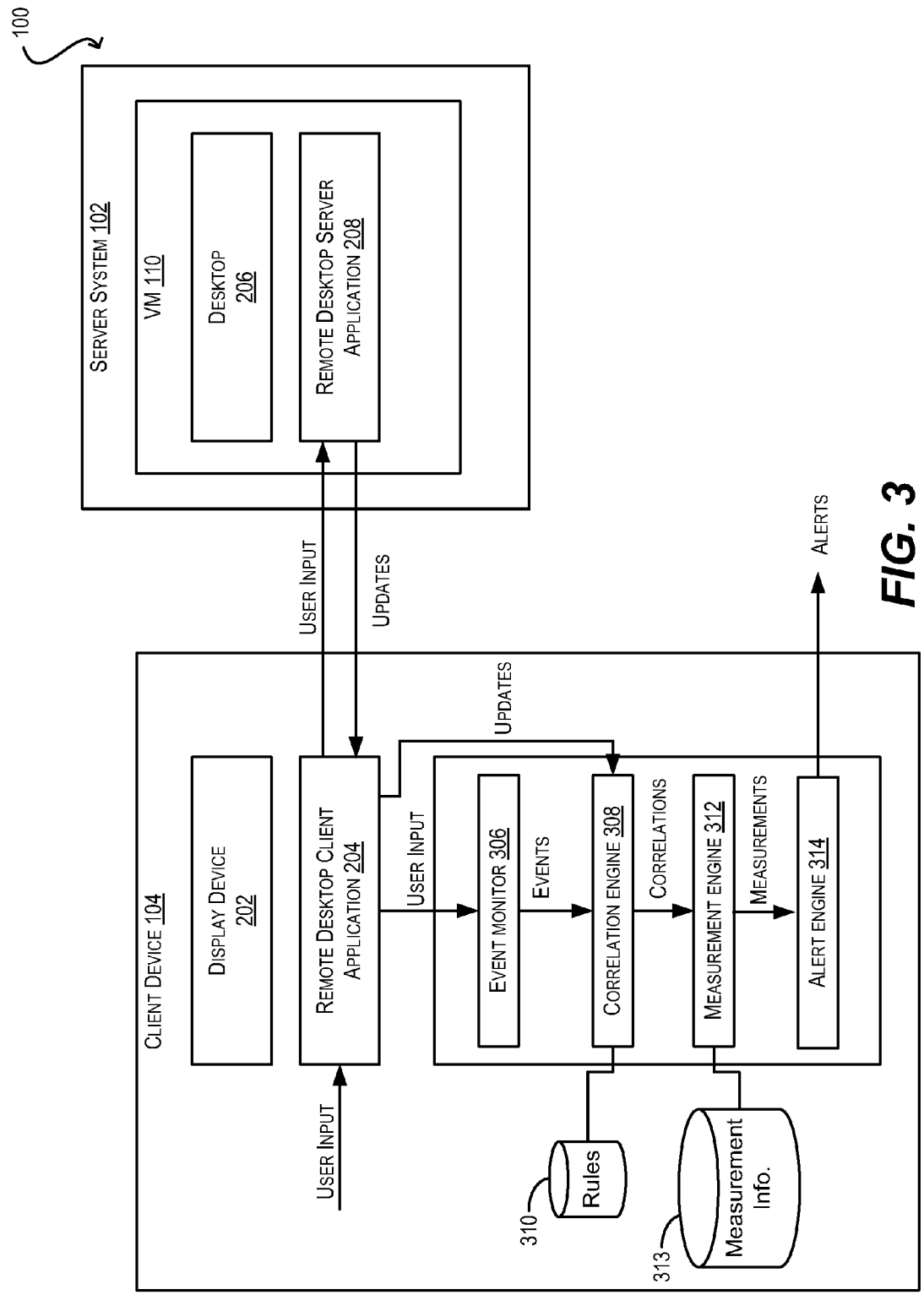
FIG. 3 depicts a more detailed example of the client device according to one embodiment.

FIG. 3 depicts a more detailed example of client device 104 according to one embodiment. Remote desktop client application 204 receives user input and desktop updates from remote desktop server application 208. An event monitor 306 monitors the user input and determines an event stream. For example, the event stream may be events based on what operations were performed by the user, such as a mouse click, keystroke, etc. Once the event is determined, a correlation engine 308 can correlate the event to a desktop update.

In one embodiment, correlation engine 308 may use a set of rules stored in storage 310 that correlates events to updates. For example, an initial configuration phase (e.g., in a testing environment) may perform a learning process that can correlate client events to updates. In the configuration phase, simulations may be run similar to the sizing analysis in which pre-determined user inputs are received and the desktop GUI is monitored to determine which updates are received. For example, a right mouse click may be correlated to a rectangular update for a drop-down menu being displayed. Also, a left mouse click in an area where a "start" menu is may be correlated to a rectangular update of a pop-up menu in the same location as the start menu. These correlations are stored as rules that client agent 210 can use to correlate events to updates. These base rules can also be statically provided based on the general behavior of user-desktop interactions, which removes any requirement for learning of the rules. However, for specific applications or use-cases, particular embodiments can expand and refine the set of rules to cover operations and applications of particular interest, or to handle irregular desktop setups by either dynamic learning or an addition of other static rules.

Measurement engine 312 measures a metric for the event. The metric may be different measurements, such as time, a resolution of the update, or other metrics. Measurement engine 312 may then store the measurement information in storage 313.

Figure 4:
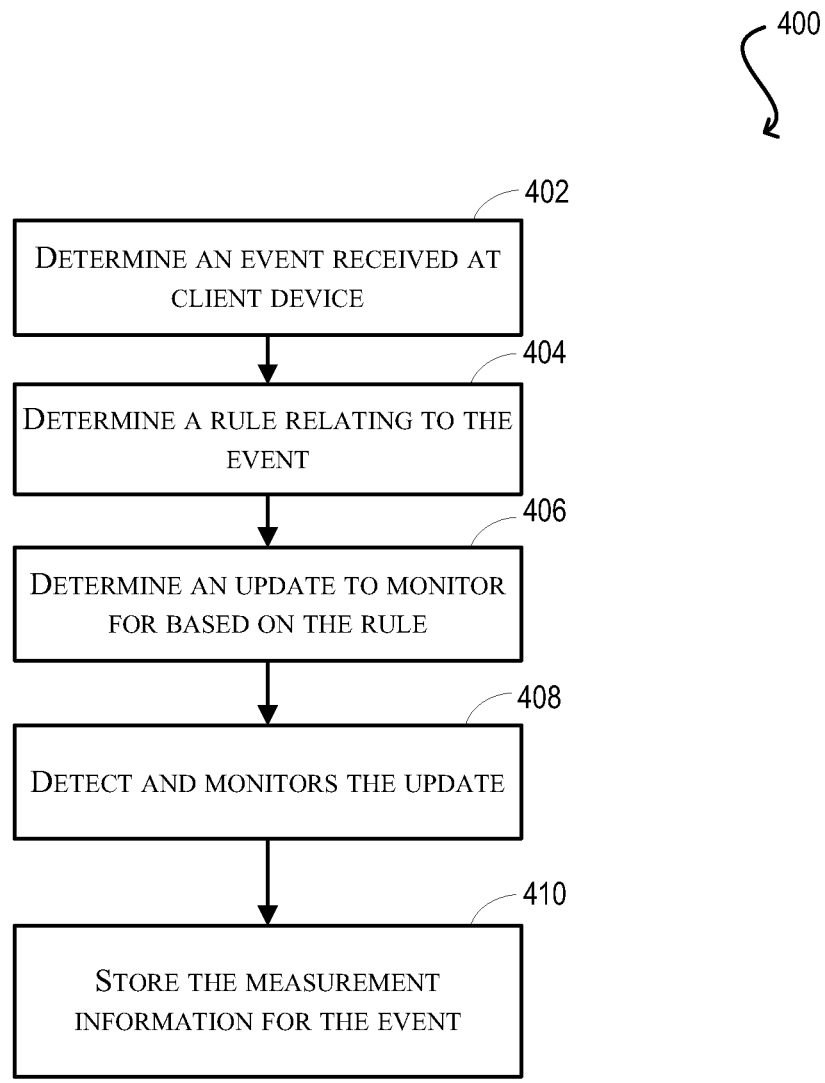
FIG. 4 depicts a simplified flowchart of a method for passively monitoring user experience for the desktop according to one embodiment.

FIG. 4 illustrates the above process in more detail. FIG. 4 depicts a simplified flowchart 400 of a method for passively monitoring user experience for the desktop according to one embodiment. At 402, event monitor 306 determines an event received at client device 104. The event may correspond to a user input, such as a mouse click.

At 404, correlation engine 308 determines a rule relating to the event. For example, correlation engine 308 may consult rules stored in storage 210 to determine a rule that corresponds to the event. By using the rule, client agent 210 may know what kind of update to look for based on the rule. Thus, at 406, correlation engine 308 determines an update to monitor for based on the rule. In detecting and monitoring the event, client agent 210 may be receiving multiple updates. For example, updates to launch applications, move the mouse pointer, or any other actions caused by user inputs may be received. Client agent 210 uses the rule to filter out the updates that should be ignored. For example, client agent 210 may ignore an update that moves the mouse pointer, but a rectangular update in the area of the mouse pointer may not be ignored.

At 408, measurement engine 312 detects and monitors the update. For example, measurement engine 312 may time from when the event occurs to when the update is finished. In one example, when a right mouse click is received, measurement engine 312 measures the time from when the mouse click is received until an update of a rectangle in a location where the mouse is located is received. Measurement engine 312 may not know that the rectangle update is for a drop-down menu, but can infer that the update corresponds to the event due to the rule for the event indicating that a right mouse click causes a rectangular update to be displayed in a location of the mouse pointer. At 410, measurement engine 312 stores the measurement information for the event.

Figure 5:
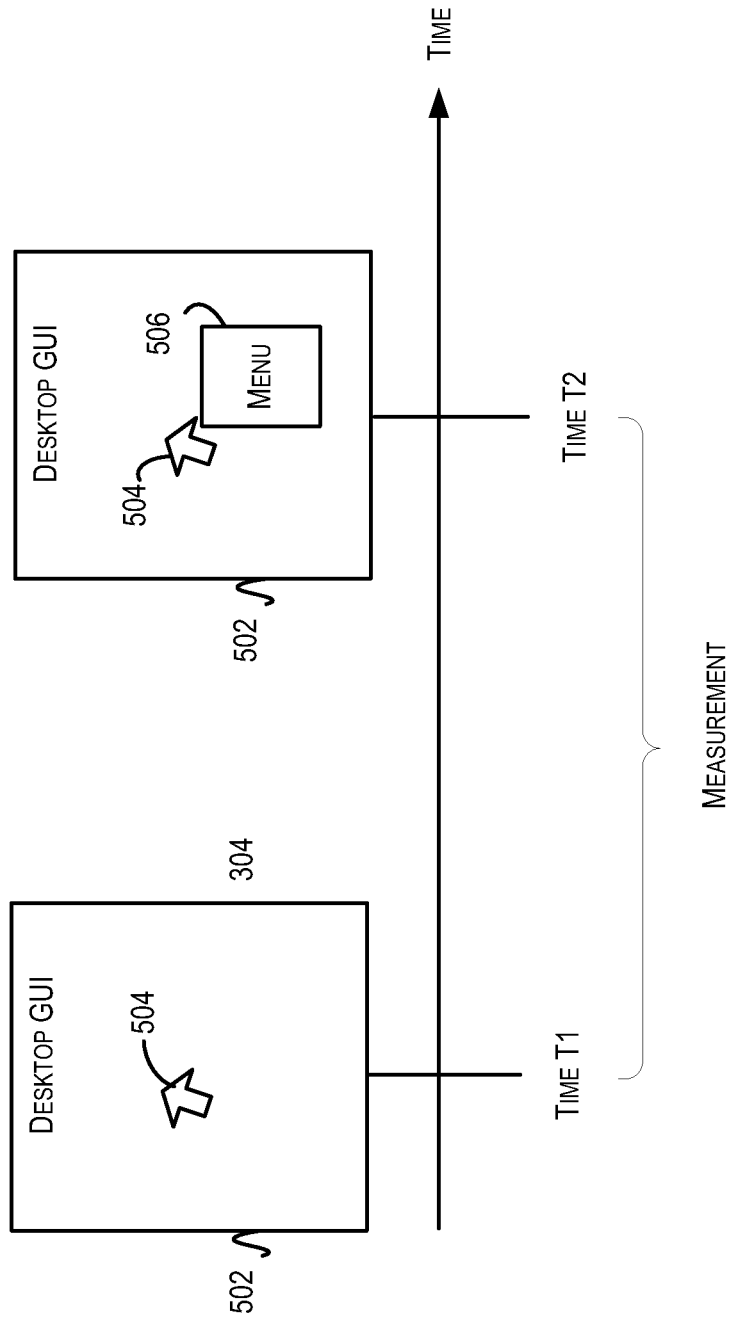
FIG. 5 shows a timeline for measuring an update according to one embodiment.

FIG. 5 shows a timeline for measuring an update according to one embodiment. At a time T1, a desktop GUI shown at 502 in client device 104 is shown. At 504, a mouse pointer is displayed in the desktop GUI. At this time, a user may enter a right mouse click. In response to receiving the right mouse click, remote desktop client application 204 may send the event for the right mouse click to remote desktop server application 208. Then, remote desktop server application 208 processes the right mouse click (i.e., applying the right mouse click to desktop 206). The right mouse click may cause a display of a menu on desktop 206. Based on the display, remote desktop server application 208 sends an update with an image of the menu to remote desktop client application 204.

At a time T2, remote desktop client application 204 displays the result of the update on the desktop GUI. In this case, at 506, the desktop GUI has displayed a drop-down menu in the location around the mouse pointer shown at 504. As discussed above, client agent 210 may measure the time from the event (e.g., right mouse click) to the opening of the drop down menu as a metric for measuring user experience, such as the time measured is the difference between T2 and T1.

The initial configuration phase may not be able to model all events with rules. Particular embodiments may thus dynamically learn and correlate events to updates. In the dynamic configuration, correlation engine 308 may observe an event in which a rule does not apply. Correlation engine 308 may then monitor updates that are received (e.g., all or a portion of the updates) and store some information based on the receiving of the updates. When the event occurs again, correlation engine 308 may monitor the updates and determine if there was any change in performance. For example, a user may double click an area of the desktop GUI (e.g., to open an application from an icon on the desktop) and correlation engine 308 observes that a large rectangular update is received. Measurement engine 312 measures the time it took for the large rectangular update to be received. When the same double click is received in the same location, correlation engine 308 may determine that it should monitor for the same rectangular update. Measurement engine 312 may then monitor to determine if the same rectangular update occurs and how long the update took. If the time taken to open the application the second time takes significantly longer than the first time, then the performance of the live VDI deployment may have degraded. The above dynamic learning process may occur over multiple events and updates until a correlation can occur. For example, multiple random updates may be occurring when the same type of event occurs. For client agent 210 to filter out all the different events to determine that the mouse double click corresponds to the large rectangular update may take multiple events where the large rectangular update keeps occurring over and over again. In this case, client agent 210 can filter out the other random events that happen to occur when the mouse double click events are received and can determine the large rectangular update that occurs over and over again is an update in response to the mouse double click.

Figure 6:
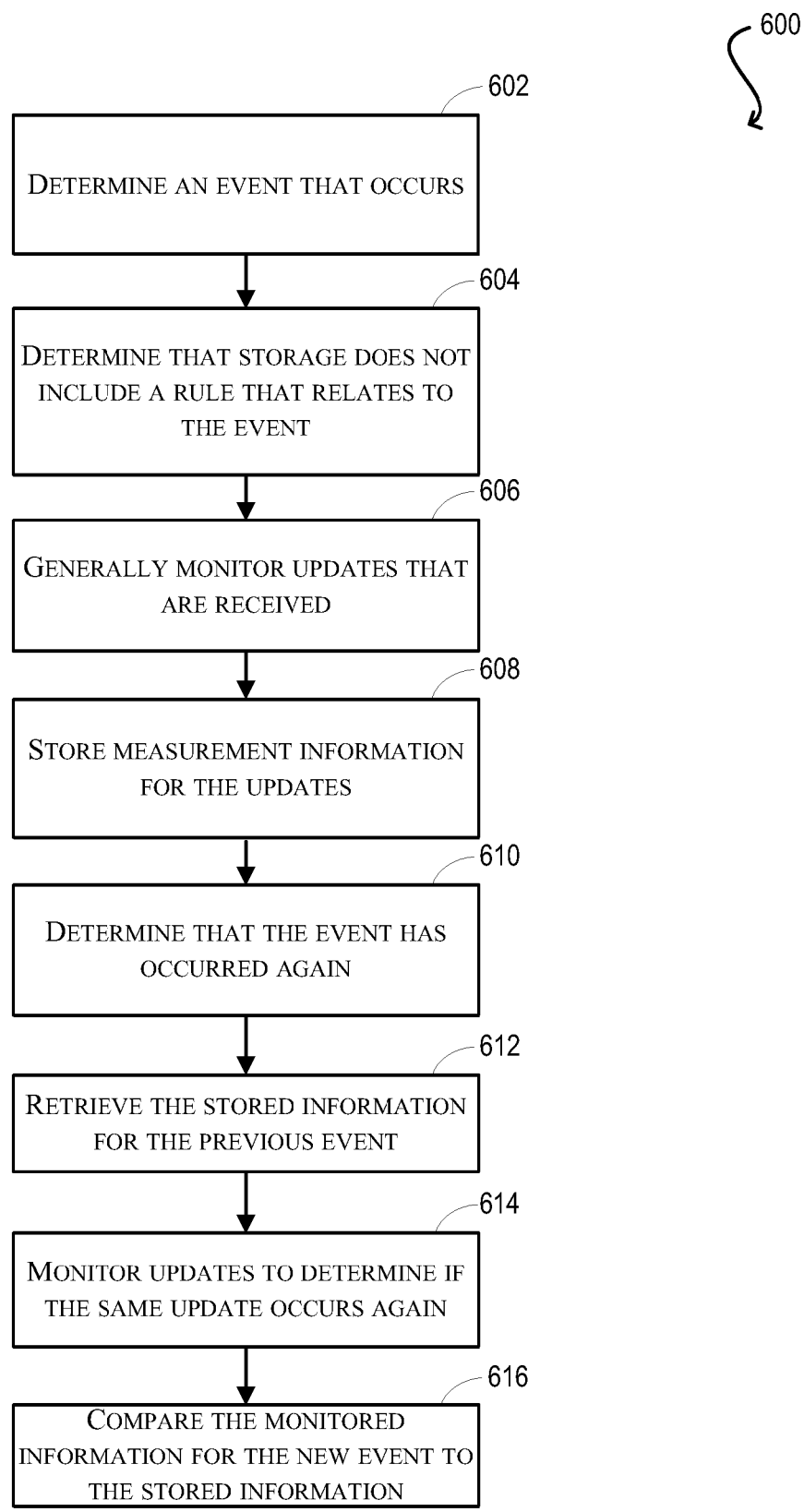
FIG. 6 depicts a simplified flowchart of a method for dynamically learning about events according to one embodiment.

FIG. 6 depicts a simplified flowchart 600 of a method for dynamically learning about events according to one embodiment. At 602, client agent 210 determines an event that occurs. At 604, client agent 210 determines that storage 210 does not include a rule that relates to the event. For example, in this case, client agent 210 does not know what kind of update to monitor for or what type of update will be received. At 606, client agent 210 generally monitors updates that are received. At 608, client agent 210 stores measurement information for the updates. For example, for the event, a rectangular update may occur that may be opening an application in additional to an update to move a mouse in a certain direction.

At 610, client agent 210 determines that the event has occurred again. In this case, client agent 210 may use previous measurements that were stored to evaluate the user experience for the event occurring again. At 612, client agent 210 retrieves the stored information for the previous event. In one example, after multiple events occur, client agent 210 may be able to deduce what update should be correlated to the event. In one example, if the same rectangular update occurred multiple times in the location of the mouse pointer, client agent may deduce that this type of update correlates to the event. Thus, at 614, client agent 210 monitors updates to determine if the same update occurs again. For example, the same type of update may occur where a rectangular update in a location of the mouse pointer is received. There may be cases in which the same update may not be received. In this case, client agent 210 may not be able to make a precise determination on what metric to measure at this point.

At 616, client agent 210 compares the monitored information for the new event to the stored information. If the update took a longer time to occur, such as the measured time is above a threshold, then client agent 210 may issue an alert. For example, for the first event, remote desktop client application 204 may have taken 1 second to display the rectangular update, thus displaying the pop up menu. However, for the second event, remote desktop client application 204 may have taken 10 seconds to display the rectangular update. In this case, it took nine more seconds to open the application, which may cause client agent 210 to determine user experience has degraded and an alert should be issued.

As just discussed, particular embodiments may output an alert based on the monitoring. For example, referring back to FIG. 3, when user experience degrades past a certain level, an alert engine 316 issues an alert. Alert engine 316 may output the alert to a user, such as an administrator, or to another system that is automatically configured to analyze the problem and possible perform some remedial action. For example, alert engine 316 may output an alert to a load balancing DRS application that may balance resources across server systems 102. For example, a virtual machine 104 may be moved from a first server system 102-1 to a different server system 102-2 that is less loaded. Different remedial actions will be described in more detail below.

Figure 7:
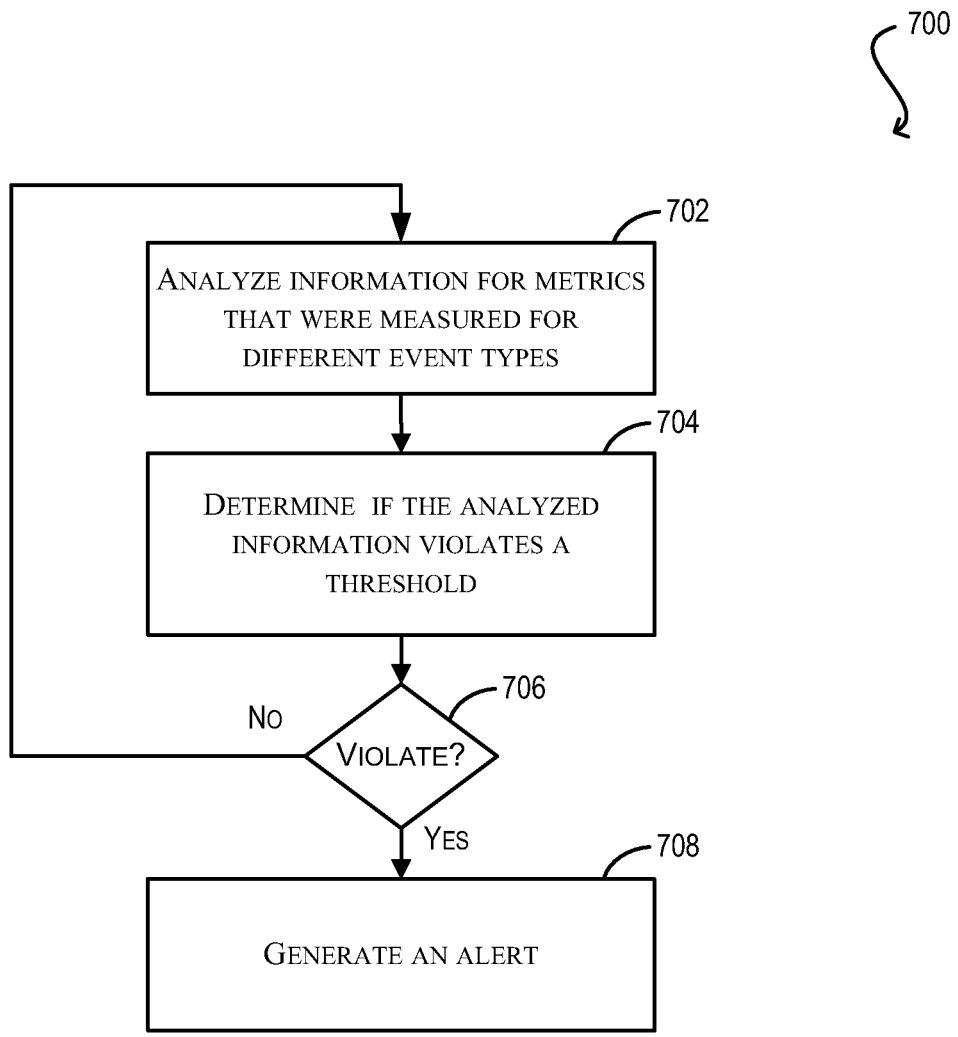
FIG. 7 depicts a simplified flowchart of a method for issuing alerts according to one embodiment.

FIG. 7 depicts a simplified flowchart 700 of a method for issuing alerts according to one embodiment. In one example, client agent 210 may not generate an alert based on a single event. Rather, client agent 210 may track multiple events across multiple occurrences and then can make a determination if performance of the live VDI deployment has degraded. For example, multiple different event types are analyzed across multiple occurrences to determine whether an alert is triggered. In one example, client agent 210 monitors events such as opening applications, moving the window, or displaying drop-down menus. If the totality of the user experience for all of these events starts to degrade, then client agent 210 may issue an alert. However, if a single event occurs in which a drop-down menu is slow to update, client agent 210 may not immediately issue an alert as this may be a one-time or isolated occurrence. Accordingly, at 702, client agent 210 analyzes information for metrics that were measured for different event types. In one example, client agent 210 may combine response times for various events to determine a total delay. In another embodiment, client agent 210 may combine response times to determine an average response time. Various methods may be used to determine the average response time, such as a weighted average. In this case, certain events may be weighted more heavily than others, such as typing and text display may be important and thus response times for typing may be weighted more heavily such that respective delays in text display may be more likely to cause an alert to be generated. In other examples, each event may have an individual average response time.

At 704, client agent 210 determines if the analyzed information violates a threshold. For example, if a totality of delay or average total delay is above a threshold or the delay for a number of individual event types is above a number of thresholds, then an alert may be generated. In one example, client agent 210 may compare the weighted average or totality of the delay to a threshold. In another embodiment, client agent 210 may compare each event type to a respective threshold to determine how many event types violate the threshold. For example, a delay for a window movement is compared to a first threshold, a delay for typing is compared to a second threshold, a delay for opening an application is compared to a third threshold, and so on. If a set number, such as 2 or 3 event types violate individual thresholds, then the threshold may be violated. By measuring different event types and using thresholds, particular embodiments may recognize that user experience may be associated with many facets and an alert is triggered when a recurring problem occurs across a number of independent metrics. For example, if the time to display a drop-down menu and also open an application goes above a threshold, then client agent 210 may determine that the live VDI deployment performance has degraded and client agent 210 may need to trigger an alert. In this case, the VDI infrastructure may be experiencing a high workload.

If the analyzed information does not violate a threshold, then the process flows back to operation 702 to continue to analyze stored information. However, at 706, if the analyzed information violates the threshold, then client agent 210 generates an alert at operation 708. It should be noted that these thresholds may be hard-coded numbers (e.g. a drop down menu should not take more than 2 seconds to appear after the right-mouse click), or could be relative metrics, i.e., response times should not increase by more than 150% above the average response time—the average being dynamically determined by client agent 210 over time. Accordingly, if it is not only possible to detect absolute performance regressions, client agent 210 builds, over time, a sense of the desktop's typical performance and generates an alert when the behavior deviates from that norm (i.e., client agent 210 may warn when a user's desktop is responding more sluggishly than normal).

When the alert is generated, particular embodiments may take various actions. For example, the alert may be a simple message to an administrator or user indicating that the performance of the desktop has degraded. In one case, the alert may pop up on the respective user's desktop GUI to indicate that the performance has degraded. This may allow the user to take action or may just notify the user that the performance degradation has been detected and may be remediated. After being notified, the user may not have to call an administrator to alert them of the problem, which may lessen the number of calls an administrator receives when desktop performance degrades. Also, if client agent 210 alerts an administrator, then the administrator may take a proactive action to analyze why the VDI infrastructure performance has degraded.

Figure 8:
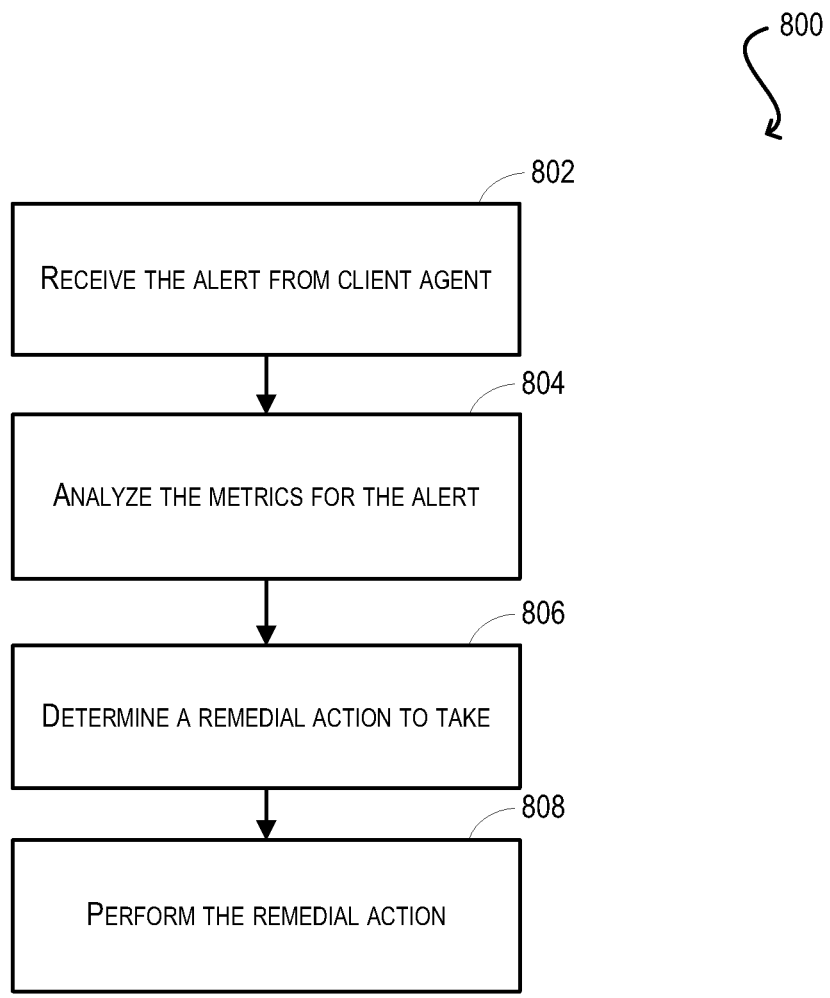
FIG. 8 depicts a simplified flowchart of a method for processing alerts automatically according to one embodiment.

In other examples, particular embodiments may automatically perform remedial actions. FIG. 8 depicts a simplified flowchart 800 of a method for processing alerts automatically according to one embodiment. In one example, client agent 210 may send the alert to a system, such as a load balancing DRS system, that can perform remedial actions. At 802, the system receives the alert from client agent 210. The alert may include various metrics that were measured that caused client agent 210 to send the alert. For example, client agent 210 may send the type of event and the delay measured. At 804, the system analyzes the metrics for the alert. For example, the system may analyze the response time that was measured.

At 806, the system determines a remedial action to take. For example, if the system determines that the workload is high on a server system 102-1 that is running the user's desktop, then the system may determine that a virtual machine 110 on server system 102 should be moved to another server system 102-2. At 808, the system then performs the remedial action. For example, the system moves virtual machine 110 to server system 102-2.

Figure 9:
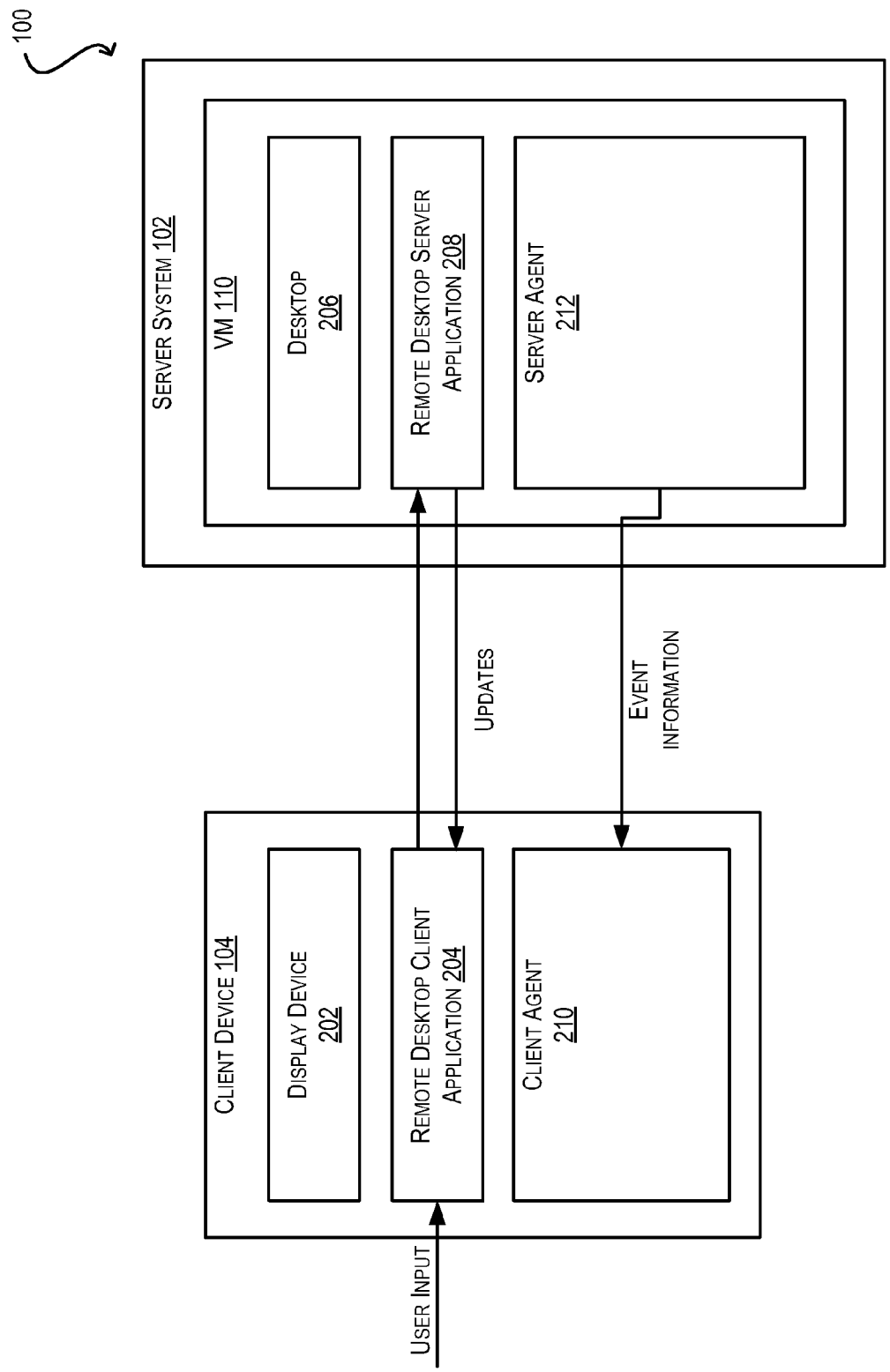
FIG. 9 depicts a more detailed example of the virtual desktop environment using a server agent according to one embodiment.

Particular embodiments were described as using just a client-side agent—client agent 210 to correlate user initiated events with screen updates. However, a server-side agent may also be used to assist in accurately correlating user input events with desktop operations. FIG. 9 depicts a more detailed example of virtual desktop environment 100 using a server agent 212 according to one embodiment. Server agent 212 may monitor events being performed on desktop 206 and may send event information to client agent 210 describing the events that are occurring on desktop 206. For example, server agent 212 may monitor a windows registry and active process information to gain additional insight to the actual operations being carried out on desktop 206. This information may then be relayed to client agent 210 to aid in the correlation process.

Server agent 212 may relay the information using a secure network connection or by leveraging various user-specific channels. For example, when an application is launched, server agent 212 may send information reporting the opening of the specific application to client agent 210. Client agent 210 may then use this information to understand the exact application being launched by the event, such as a double-click event that was observed in the event stream received at client device 104 can be correlated to the specific application that was launched. In this way, instead of just monitoring for rectangular updates, and inferring that some application had launched, client agent 210 would know the exact application that was launched and also may report the time that it took to launch this exact application by comparing the user event time with the time of completion of the large rectangular area update. This may provide better metrics to a system that will analyze the VDI infrastructure. For example, the system would know that a specific application may be causing a problem rather than in general opening applications may be slow.

Also, the information generated by client agent 210 may be supplemented by other metrics collected by various enterprise monitoring solutions. These other metrics may be useful in cross correlation. For example, if computer processing unit (CPU) utilization, disk latency, or network utilization are high, but the user experience is not degrading, then particular embodiments may not need to take corrective action because the workload may not be high.

Accordingly, particular embodiments provide a passive agent that can be installed on client device 104 to monitor the user experience. Client agent 210 attempts to correlate events that occur on client device 104, such as user mouse and keyboard events, that are accessible to client device 104 with updates to the desktop (e.g., visual changes) using a set of rules for the correlation. Accordingly, even though client agent 210 does not have insight into what is occurring on the desktop being executed on server system 102, client agent 210 may use the correlation to measure different metrics for user experience.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    determining, by a client device configured to remotely access a desktop hosted by a server system, an event related to a user input for a desktop operation directed to the desktop, wherein the event causes specific content to be outputted on the client device;
    determining, by the client device, whether there is a rule associated with the event, wherein the rule is one of a plurality of rules, wherein the plurality of rules correlate particular events to particular types of updates, and wherein each rule allows the client device to infer that an update corresponds to a particular event;
    in response to determining that no rule of the plurality of rules applies to the event, dynamically learning a correlation between the event and a corresponding update;
    receiving, by the client device, a plurality of updates to the desktop GUI, wherein the plurality of updates include content;
    analyzing, by the client device, the plurality of updates to determine a particular update providing a visual change occurs on the desktop GUI that matches the update learned for the event;
    correlating, by the client device, the event to the particular update of the plurality of updates to the desktop GUI;
    monitoring, by the client device, a metric for the particular update; and
    storing, by the client device, information measured for the metric.

2. The method of claim 1, wherein correlating comprises:
    determining a pre-determined update for the event based on the learned correlation; and
    monitoring the plurality of updates to determine if the pre-determined update occurs.

3. The method of claim 2, wherein if the pre-determined update occurs in the plurality of updates, monitoring the metric for the pre-determined update.

4. The method of claim 1, wherein the event comprises a first event and the metric comprises a first metric, the method further comprising:
    determining when rules in the set of rules do not apply to a second event;
    selecting, by the client device, updates to monitor based on the second event occurring multiple times;
    monitoring, by the client device, a second metric for the updates;
    after determining when rules in the set of rules do not apply to the second event, generating, by the client device, a second rule for the second event based on at least a portion of the updates, the second rule not found in the set of rules;
    storing, by the client device, first information measured for the second metric for the at least the portion of the updates for the second rule;
    when the second event occurs again, monitoring, by the client device, the second metric for a second update for the second event that occurred again; and
    storing, by the client device, second information measured for the second metric for the second update associated with the second event that occurred again.

5. The method of claim 4, further comprising analyzing the first information and the second information to determine if a performance degradation occurred for the second event that occurred again.

6. The method of claim 1, further comprising outputting the information measured for the metric to a service to analyze performance of the server system with respect to the metric.

7. The method of claim 1, wherein information measured for the metric includes a timing delay from the event to a completion of the particular update.

8. The method of claim 1, wherein a first rule of the plurality of rules indicates the visual change in which to monitor for on the desktop GUI for the client device.

9. The method of claim 8, wherein monitoring is performed for a predefined period of time in a predefined location for the visual change per the first rule.

10. The method of claim 1, wherein the particular update comprises a set of visual changes to the desktop GUI.

11. The method of claim 1, further comprising filtering out other updates in the plurality of updates to monitor only the particular update correlated to the event.

12. The method of claim 1, further comprising:
    analyzing stored information for metrics monitored for a plurality of events;
    determining if the stored information violates a threshold; and
    outputting an alert when the stored information violates the threshold.

13. The method of claim 12, wherein outputting the alert comprises displaying a notification on the desktop GUI for the client device based on the monitoring.

14. The method of claim 12, wherein determining if the stored information violates a threshold comprises analyzing a totality of the stored information for metrics associated with the plurality of events to the threshold.

15. The method of claim 12, wherein determining if the stored information violates a threshold comprises analyzing stored information for metrics associated with multiple event types from the plurality of events to the threshold.

16. The method of claim 1, further comprising:
    receiving, from the server system, information regarding an operation performed on the desktop; and
    using the information to determine the particular update to monitor.

17. The method of claim 1, wherein the client device and the server system are operating in a live environment.

18. The method of claim 1, further comprising:
    determining a second event;
    determining that no rule of the plurality of rules applies to the second event; and
    dynamically learning a correlation between the second event and a corresponding update.

19. The method of claim 18, wherein the dynamic learning comprises:
    monitoring updates received after the second event;
    determining that a new event corresponding to the second event has occurred; and
    monitoring updates received after the new event for changes in performance.

20. The method of claim 19, wherein monitoring updates includes determining common updates occurring after the second event and after the new event.

21. A non-transitory computer readable medium embodying computer software, the computer software being executable by a client device and causing the client device to perform:
- determining, by the client device configured to remotely access a desktop hosted by a server system, an event related to a user input for a desktop operation directed to the desktop, wherein the event causes specific content to be outputted on the client device;
- determining, by the client device, whether there is a rule associated with the event, wherein the rule is one of a plurality of rules, wherein the plurality of rules correlate particular events to particular types of updates, and wherein each rule allows the client device to infer that an update corresponds to a particular event;
- in response to determining that no rule of the plurality of rules applies to the event, dynamically learning a correlation between the event and a corresponding update;
- receiving, by the client device, a plurality of updates to the desktop GUI, wherein the plurality of updates include content;
- analyzing, by the client device, the plurality of updates to determine a particular update providing a visual change occurs on the desktop GUI that matches the update learned for the event;
- correlating, by the client device, the event to the particular update of the plurality of updates to the desktop GUI;
- monitoring, by the client device, a metric for the particular update; and
- storing, by the client device, information measured for the metric.

22. The non-transitory computer-readable storage medium of claim 21, wherein correlating comprises:
- determining a pre-determined update for the event based on the learned correlation; and
- monitoring the plurality of updates to determine if the pre-determined update occurs.

23. An apparatus comprising:
- one or more computer processors; and
- a non-transitory computer readable medium embodying computer software, the computer software being executable by a client device and causing the client device to perform:
- determining, by the client device configured to remotely access a desktop hosted by a server system, an event related to a user input for a desktop operation directed to the desktop, wherein the event causes specific content to be outputted on the client device;
- determining, by the client device, whether there is a rule associated with the event, wherein the rule is one of a plurality of rules, wherein the plurality of rules correlate particular events to particular types of updates, and wherein each rule allows the client device to infer that an update corresponds to a particular event;
- in response to determining that no rule of the plurality of rules applies to the event, dynamically learning a correlation between the event and a corresponding update;
- receiving, by the client device, a plurality of updates to the desktop GUI, wherein the plurality of updates include content;
- analyzing, by the client device, the plurality of updates to determine a particular update providing a visual change occurs on the desktop GUI that matches the update learned for the event;
- correlating, by the client device, the event to the particular update of the plurality of updates to the desktop GUI;
- monitoring, by the client device, a metric for the particular update; and
- storing, by the client device, information measured for the metric.

* * * * *